United States Patent
Sato (10) Patent No.: US 11,420,541 B2
(45) Date of Patent: Aug. 23, 2022

(54) VEHICLE SEAT

(71) Applicant: TS TECH CO., LTD., Saitama (JP)

(72) Inventor: Shoma Sato, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/175,746

(22) Filed: Feb. 15, 2021

(65) Prior Publication Data

US 2021/0162897 A1 Jun. 3, 2021

Related U.S. Application Data

(63) Continuation of application No. 16/575,886, filed on Sep. 19, 2019, now Pat. No. 10,919,419, which is a
(Continued)

(30) Foreign Application Priority Data

Mar. 31, 2016 (JP) .................................. 2016-071011

(51) Int. Cl.
*B60N 2/30* (2006.01)
*B60N 2/36* (2006.01)
(Continued)

(52) U.S. Cl.
CPC ....... *B60N 2/3086* (2013.01); *B60N 2/01583* (2013.01); *B60N 2/305* (2013.01);
(Continued)

(58) Field of Classification Search
CPC .......................... B60N 2/3086; B60N 2/01583; B60N 2/3011; B60N 2/305; B60N 2/366;
(Continued)

(56) References Cited

U.S. PATENT DOCUMENTS

| 4,836,597 A | 6/1989 | Izumida |
| 7,070,223 B2 | 7/2006 | Jeong |

(Continued)

FOREIGN PATENT DOCUMENTS

| JP | S 63-137054 A | 6/1988 |
| JP | H051347 U | 1/1993 |

(Continued)

OTHER PUBLICATIONS

Japanese Office Action (w/ English Translation) for corresponding Japanese Patent Application No. 2019-237330, dated Apr. 6, 2021—6 pages.

*Primary Examiner* — Mark R Wendell
(74) *Attorney, Agent, or Firm* — Dority & Manning, P.A.

(57) ABSTRACT

An adequate mechanical stiffness and strength are afforded to a tumble seat or a vehicle seat having a latch mechanism provided in a rear end of the seat cushion. A cushion frame (F1) of the seat includes a side frame (5) extending in a fore and aft direction, and the side frame includes a first member (10) comprising a channel member having an open side facing sideways and a second member (11) attached to the first member so as to form a closed cross section jointly with the first member, and extending downward further than the first member. A latch mechanism is positioned under the first member and attached to the second member.

13 Claims, 5 Drawing Sheets

Related U.S. Application Data continuation of application No. 16/222,410, filed on Dec. 17, 2018, now Pat. No. 10,434,904, which is a continuation-in-part of application No. 15/595,275, filed on May 15, 2017, now Pat. No. 10,173,557.

(51) Int. Cl.
  *B60N 2/68* (2006.01)
  *B60N 2/015* (2006.01)
  *B60N 2/54* (2006.01)
  *B60N 2/70* (2006.01)
  B60N 2/22 (2006.01)
  B60N 2/50 (2006.01)

(52) U.S. Cl.
  CPC ............ *B60N 2/3011* (2013.01); *B60N 2/366* (2013.01); *B60N 2/544* (2013.01); *B60N 2/682* (2013.01); *B60N 2/7052* (2013.01); B60N 2/2245 (2013.01); B60N 2/30 (2013.01); B60N 2/3047 (2013.01); B60N 2/50 (2013.01); B60N 2/70 (2013.01)

(58) Field of Classification Search
  CPC ........ B60N 2/30; B60N 2/3047; B60N 2/544; B60N 2/682; B60N 2/7052; B60N 2/2245; B60N 2/50; B60N 2/70
  USPC ..................................................... 297/378.12
  See application file for complete search history.

(56) References Cited

U.S. PATENT DOCUMENTS

| | | | |
|---|---|---|---|
| 8,573,699 | B2 | 11/2013 | Zekavica |
| 10,086,792 | B1 | 10/2018 | Watanabe |
| 10,919,419 | B2 * | 2/2021 | Sato ........................ B60N 2/682 |
| 2003/0025373 | A1 | 2/2003 | Shinozaki |
| 2005/0269854 | A1 | 12/2005 | Lutzka et al. |
| 2007/0080555 | A1 | 4/2007 | Lutzka et al. |
| 2008/0224520 | A1 | 9/2008 | Veluswamy et al. |
| 2009/0243324 | A1 | 10/2009 | Grable et al. |
| 2010/0230986 | A1 | 9/2010 | Scholl |
| 2011/0121603 | A1 | 5/2011 | Blatseas et al. |
| 2011/0163582 | A1 | 7/2011 | Nazione et al. |
| 2012/0301212 | A1 | 11/2012 | Champ et al. |
| 2013/0300145 | A1 | 11/2013 | Otake et al. |
| 2013/0341953 | A1 | 12/2013 | White et al. |
| 2014/0167474 | A1 | 6/2014 | Jeong et al. |
| 2015/0069808 | A1 | 3/2015 | White et al. |
| 2016/0016492 | A1 | 1/2016 | Subramanian et al. |

FOREIGN PATENT DOCUMENTS

| | | |
|---|---|---|
| JP | H0867188 A | 3/1996 |
| JP | H 10-127406 A | 5/1998 |
| JP | 2003/175751 A | 6/2003 |
| JP | 2012131248 | 7/2012 |

* cited by examiner

VEHICLE SEAT

TECHNICAL FIELD

The present invention relates to a vehicle seat adapted to be mounted on a vehicle.

BACKGROUND ART

The tumble seat is known as a seat used for a second row or a third row seat for a vehicle. The seat cushion of the tumble seat has a front end pivotally attached to the floor of the vehicle, and can be pivoted forward into an upright, retracted position with the seat back folded onto the seat cushion. See JP2012-131248A, for instance. The rear end of the tumble seat is provided with a latch that can be detachably engaged by a striker fixedly secured to the floor. The latch can be manually released by using a lever connected to the latch via a cable.

The rear end of the tumble seat is secured to the seat solely via the engagement between the latch and the striker so that the latch is required to have an adequate mechanical stiffness and strength. Also, the structure of the latch is desired to be as simple as possible from commercial viewpoints.

BRIEF SUMMARY OF THE INVENTION

In view of such problems of the prior art, a primary object of the present invention is to provide an adequate mechanical stiffness and strength to a tumble seat or a vehicle seat having a latch mechanism provided in a rear end of the seat cushion.

A second object of the present invention is to provide a vehicle seat of this type which is simple in structure.

To achieve such objects, the present invention provides a vehicle seat including a seat cushion frame (F1) having a front part pivotally supported by a floor and a rear part fitted with a latch mechanism (20) adapted to be detachably engaged by a striker (3) attached to the floor, wherein the seat cushion frame includes a pair of side frames (5) extending in a fore and aft direction on either side of the seat cushion frame, a front frame (6) connecting front ends of the side frames to each other, and a rear frame (7) connecting rear ends of the side frames to each other, and at least one of the side frames includes a first member (10) comprising a channel member having an open side facing sideways and a second member (11) attached to the first member so as to form a closed cross section jointly with the first member, and extending downward further than the first member, the latch mechanism being positioned under the first member and attached to the second member.

According to this arrangement, as the second member of the side frame which is required to support the latch mechanism forms a part of the closed section, the latch mechanism can be attached to a highly stiff part of the side frame. As the latch mechanism is positioned under the first member or under the closed cross section, the lateral dimension of the assembly including the latch mechanism and the side frame can be minimized. As the latch mechanism is attached to a part of the second member extending further downward than the first member, the mounting structure of the latch mechanism can be simplified. As the latch mechanism can be attached to the second member from the lateral direction, instead from below, the assembly work is simplified.

In this invention, the front frame may include a main part (6A) extending laterally and a pair of end parts (6B) each bent from a corresponding lateral end of the main part in a rearward direction and received in and fixedly secured to the corresponding first member.

According to this arrangement, a significant overlap may be created between the front frame and the side frame so that the stiffness of the joint between the first member and the front frame can be improved.

In this invention, the first member and the second member of each side frame may jointly define a front opening (3) of the side member, and the rear part of the corresponding end part of the front frame is passed into a space defined jointly by the first member and the second member from the front opening, the rear part being attached to both the first member and the second member.

According to this arrangement, as the end part of the front frame is connected to both the first and second members, the stiffness of the side frame can be improved even further.

In a preferred embodiment of the present invention, each rear part of the front frame comprises a pipe member, and the second member is provided with a contoured part (11C) conforming to an opposing curved outer surface of the rear part.

The contoured part increases the stiffness of the second member so that the stiffness of the side member can be increased even further.

In a particularly preferred embodiment of the present invention, the first member comprises a vertically extending first side wall (10A), a first upper wall (10B) extending from an upper edge of the first side wall and a first lower wall (10C) extending from a lower edge of the first side wall in a same direction, and the second member (11) comprises a second upper wall (11B) overlying the first upper wall, and a second side wall (11A) extending downward from the second upper wall beyond the first lower wall, wherein the first lower wall is provided with a tab extending beyond a free end edge of the first upper wall, and the second side wall is provided with a through hole for passing through the tab.

According to this arrangement, as the deformation of the first and second members are restricted by the tab being passed through the through hole, the stiffness of the side frame can be improved.

In this invention, a part of the tab projecting from the through hole may be provided with an engagement feature for engaging another member.

Thereby, the tab may be conveniently used for engaging or retaining another member such as a control cable and a wire harness.

In this invention, the second side wall may be provided with a reinforcement feature (15) extending from a part located above the first lower wall to a part located under the first lower wall.

According to this arrangement, the stiffness of the second member can be increased. In particular, the stiffness of the part of the second member supporting the latch mechanism can be increased.

In a preferred embodiment of the present invention, a rear end of the first side wall is connected to a rear wall (10E) extending in a same direction as the first side wall, and a rear end (11E) of the second side wall is positioned ahead of the rear wall so that a rear opening (14) is defined in the side frame, a corresponding end of the rear frame being fitted into the rear opening, and connected to both the first member and the second member.

Thus, the stiffness of the joint between the rear frame and the side frame can be increased. As the rear frame is connected to both the first member and the second member, the stiffness of the side frame can be increased.

In the present invention, the rear wall may connect the first upper wall and the first lower wall to each other, and extend substantially flush with a rear surface of the rear frame.

Thereby, the stiffness of the first member can be increased.

In the present invention, a connecting frame may be connected between laterally middle parts of the front frame and the rear frame, the connecting frame being formed with an engagement hole for engaging a retaining piece for retaining a cable.

The connecting member effectively increases the stiffness of the seat cushion frame. Also, the connecting frame may be used for securing a retaining member to the seat cushion frame.

Thus, according such arrangements, in a vehicle seat constructed as a tumble seat, the mounting structure for mounting a latch mechanism configured to cooperate with a striker attached to a floor can be realized as a high stiff and simple structure.

DETAILED DESCRIPTION OF THE PREFERRED EMBODIMENT

An embodiment of the present invention in the form of a rear seat (which may be a second row or a third row seat) of a vehicle is described in the following. In the following description, the directions are based on the view of an occupant in the seat, and the central part of the seat is referred to as being "inner" while the lateral end part is referred to as being "outer". Various component parts are provided symmetrically to one another on either side of the seat, and may be denoted with same numerals, but only one of each pair of such component parts may be discussed in the following disclosure as they are mirror images of each other.

Figure 1:
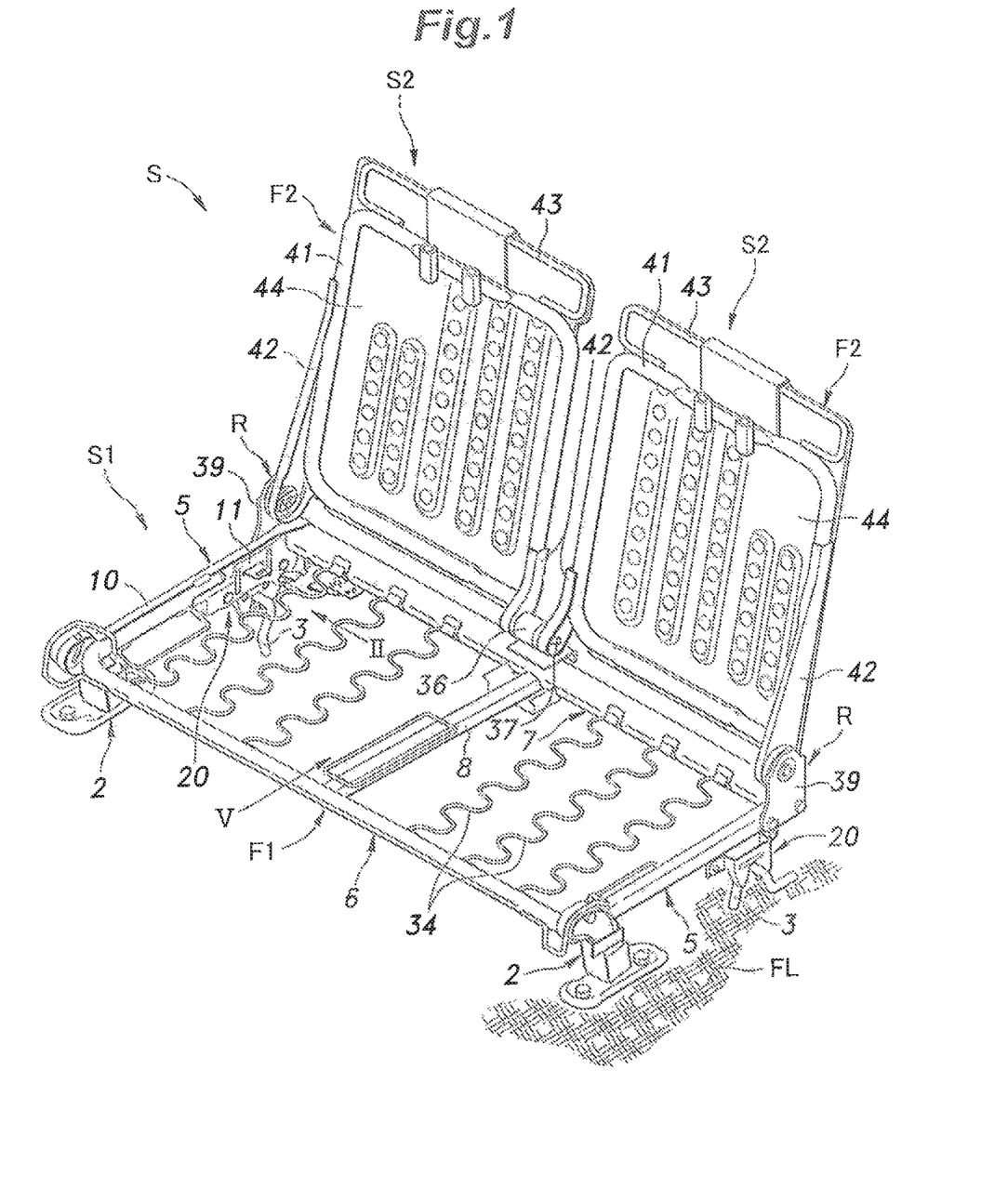
FIG. 1 is a perspective view of a seat frame of a vehicle seat of a first embodiment of the present invention as seen from an upper left direction.
Figure 2:
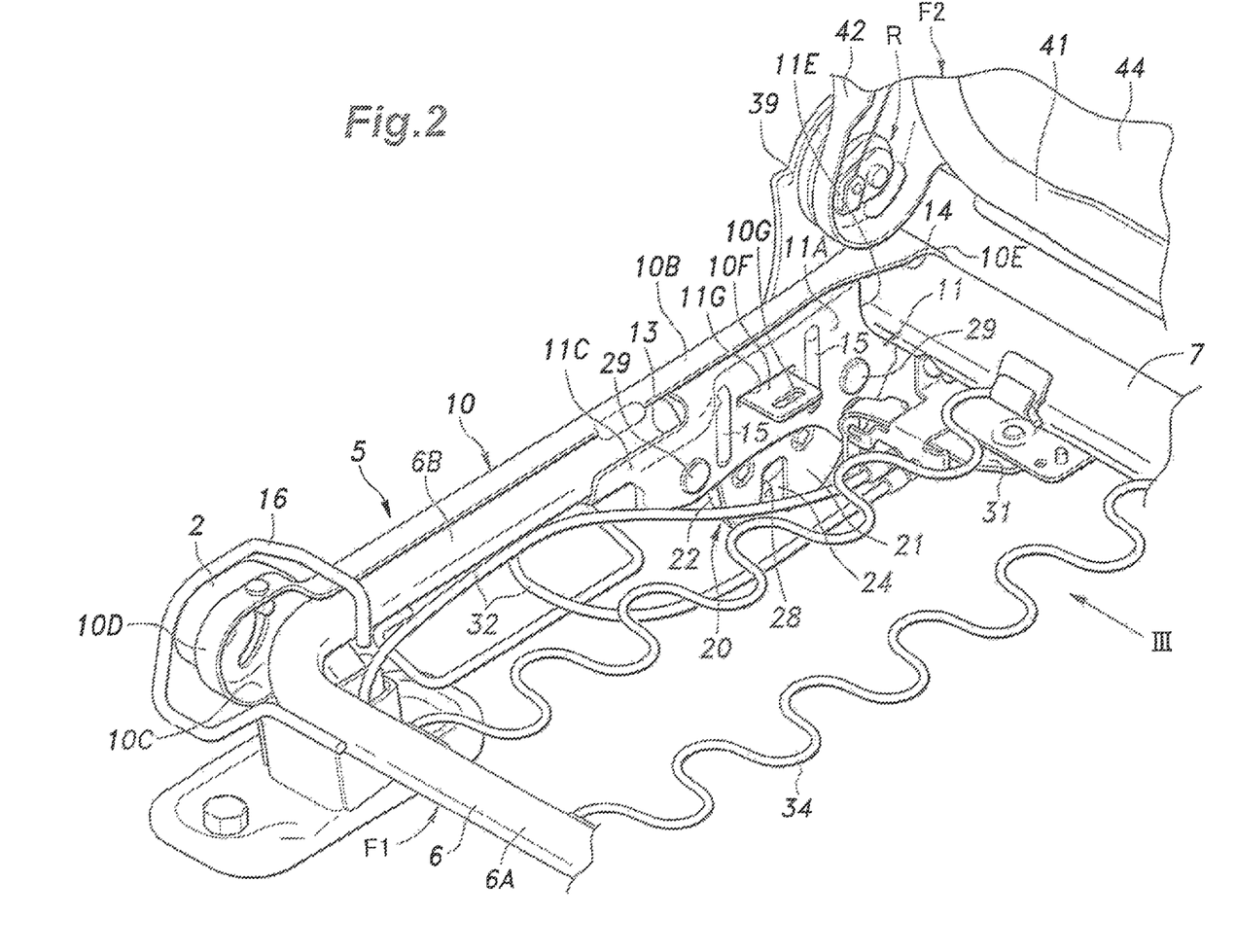
FIG. 2 is a fragmentary enlarged perspective view of a right seat cushion frame with a striker omitted from illustration.

As shown in FIGS. 1 and 2, the seat S includes a seat cushion S1 incorporated with a seat cushion frame F1, and a pair of seat backs S2 each incorporated with a seat back frame F2 pivotally connected to the seat cushion frame F1. The seat cushion frame F1 is pivotally supported by a floor FL of the vehicle at a front end thereof via a pair of support bases 2 fixedly attached to the floor FL, and detachably engaged by a pair of strikers 3 fixedly attached to the floor FL at a rear end thereof.

Each support base 2 projects upward from the floor FL, and has an upper end that pivotally supports the front end of the seat cushion frame F1 around a rotational center line extending in the lateral direction. Each support base 2 may be made of stamp formed sheet metal, and has an upper end projecting in a forward direction.

Each striker 3 is provided with a pair of side columns 3A extending upward from the floor FL and a lateral beam 3B extending laterally between the upper ends of the side columns 3A. Each laterally outward rear end part of the seat cushion frame F1 is fitted with a latch (which will be described hereinafter) which is detachably engaged by the lateral beam 3B of the corresponding striker 3.

The seat cushion S1 is formed by covering the seat cushion frame F1 with a pad and a skin member not shown in the drawings. Similarly, each seat back S2 is formed by covering the seat back frame F2 with a pad and a skin member not shown in the drawings. The seat cushion frame F1 and the seat back frame F2 may be made of metallic sheet, pipe and/or rod members.

Each seat back frame F2 is connected to the seat cushion frame F1 via a per se known reclining mechanism R for adjustably fixing the seat back frame F2 at desired angular positions relative to the seat cushion frame F1. In particular, the reclining mechanism R is configured such that each seat back S2 can be folded onto the upper surface of the seat cushion S1.

As shown in FIGS. 1 and 2, the seat cushion frame F1 is formed as a rectangular frame including a pair of cushion side frames 5 extending in the fore and aft direction along either side of the seat cushion frame F1, a front frame 6 extending between front parts of the cushion side frames 5, a rear frame 7 extending between rear parts of the cushion side frames 5, and a connecting frame 8 connecting laterally middle parts of the front frame 6 and the rear frame 7 to each other. The front frame 6 and the rear frame 7 are made of circular pipe members. The front frame 6 includes a laterally extending, linear main part 6A and a pair of end parts 6B that are bent from respective ends of the main part 6A in a rearward direction. The rear frame 7 extends linearly.

Figure 3:
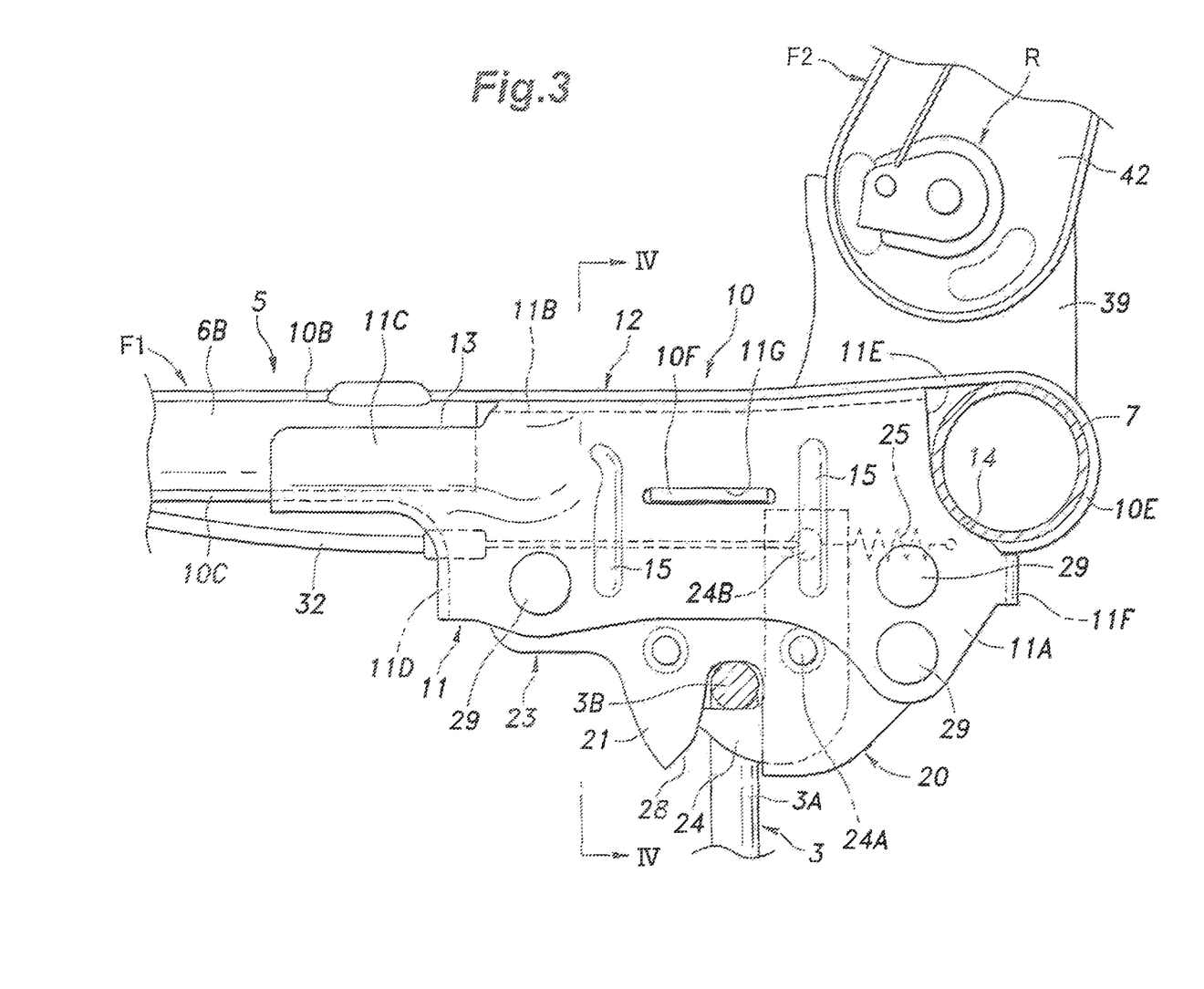
FIG. 3 is a fragmentary side view as seen from a direction indicated by arrow III in FIG. 2.
Figure 4:
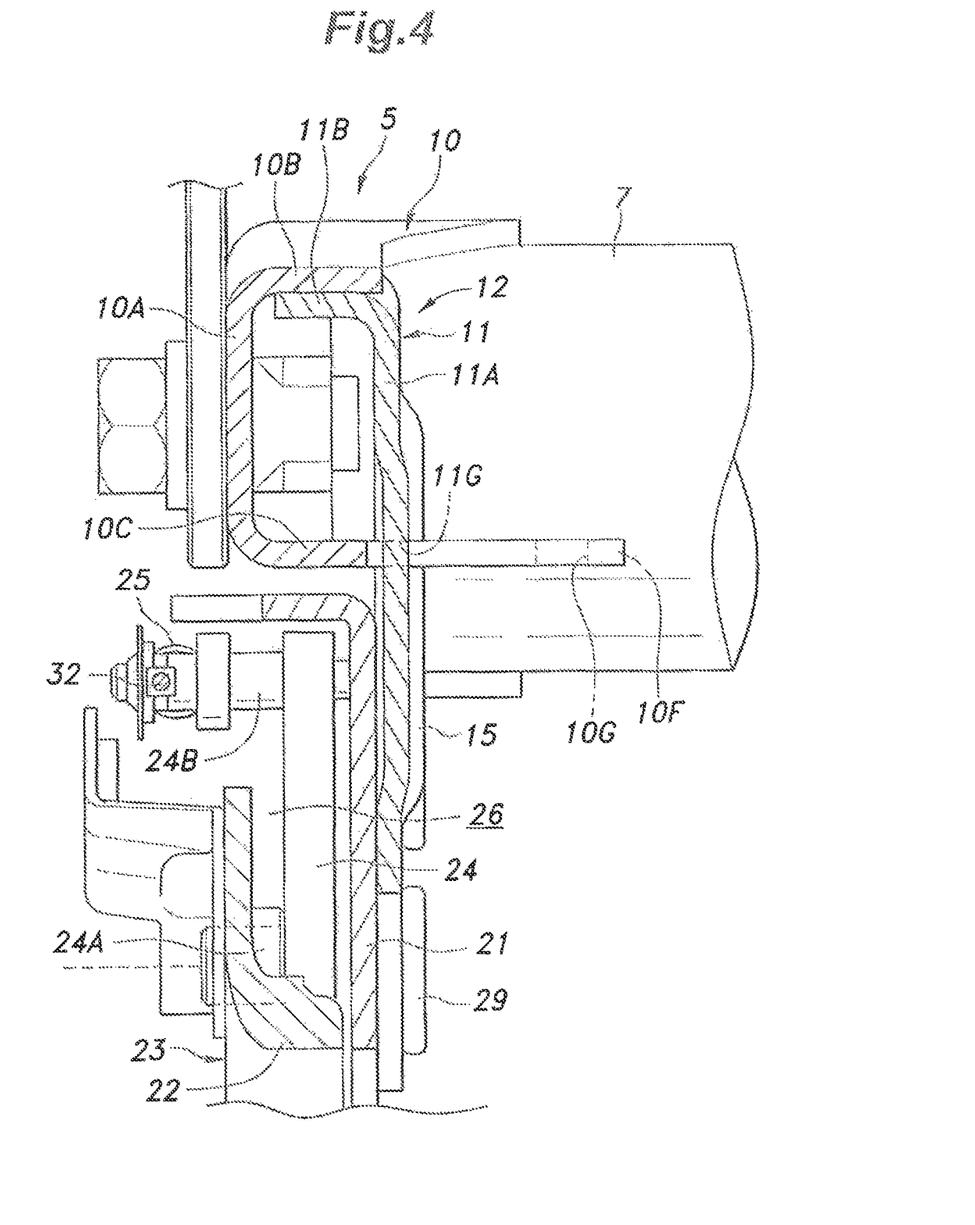
FIG. 4 is a sectional view taken along line IV-IV of FIG. 3.

The two cushion side frames 5 are symmetric to each other (or mirror images of the other). As shown in FIGS. 2 to 4, the cushion side frame 5 is formed by combining a first member 10 and a second member 11 which are each made of stamp formed sheet metal. The second member 11 is located on the inner side of the first member 10. The first member 10 includes a first side wall 10A having a major plane facing the lateral direction and extending in the fore and aft direction, a first upper wall 10B extending from the upper edge of the first side wall 10A in the inward direction, a first lower wall 10C extending from the lower edge of the first side wall 10A in the inward direction, a first front wall 10D extending from the front edge of the first side wall 10A in the inward direction, and a first rear wall 10E extending from the rear edge of the first side wall 10A in the inward direction. Thus, as shown in FIG. 4, the first member 10 consists of a channel member having an open side facing the inward direction.

As shown in FIGS. 2 and 3, the front edge and the rear edge of the first side wall 10A are each shaped in a semi-circular shape in side view so that the first front wall 10D and the first rear wall 10E are curved in a corresponding manner as they extend vertically, and present convex surfaces in the forward and rearward directions, respectively. The upper ends of the first front wall 10D and the first rear wall 10E are smoothly connected to the front end and the rear end of the first upper wall 10B, respectively, and the lower ends of the first front wall 10D and the first rear wall 10E are smoothly connected to the front end and the rear end of the first lower wall 10C, respectively. Thus, the first upper wall 10B, the first lower wall 10C, the first front wall 10D and the first rear wall 10E extend continuously along the periphery of the first side wall 10A.

As shown in FIGS. 2 to 4, the second member 11 includes a second side wall 11A having a major place facing the lateral direction and extending in the fore and aft direction, and a second upper wall 11B extending from the upper edge of the second side wall 11A in the outward direction. The rear end of the second member 11 substantially align with the rear end of the first member 10 in side view, but is shorter in length than the first member 10. The first member 10 and the second member 11 are combined to each other so that the upper surface of the second upper wall 11B abuts the lower surface of the first upper wall 10B, and the inner edge of the first lower wall 10C abuts the outer surface of the second side wall 11A, and are welded to each other at appropriate parts. As a result, the first member 10 and the second member 11 jointly define a rectangular pipe member 12 having a substantially rectangular closed cross section. The second side wall 11A extends downward further than the first side wall 10A.

The front end of the second side wall 11A is provided with a contoured part 11C having a semi-cylindrical cross section and an inwardly facing convex surface. The contoured part 11C extends forward beyond the front end of the second upper wall 11B. The lower edge of the contoured part 11C is bent in the outward direction so as to be laid over the lower surface of the first lower wall 10C. The upper edge of the contoured part 11C is spaced from the lower surface of the first upper wall 10B. Thus, the contoured part 11C and the corresponding part of the first member 10 jointly defines a C-shaped cross section, or a bore extending in the fore and aft direction and having a front opening 13. The lower edge of the contoured part 11C is welded to appropriate parts of the first lower wall 10C. The second member 11 further includes a second front wall 11D that extends from the front edge of the second side wall 11A in the outward direction, and is smoothly connected to the lower end of the contoured part 11C.

As shown in FIG. 3, the rear edge of the second side wall 11A is formed with an arcuate cutout 11E which defines a circular rear opening 14 in cooperation with the first rear wall 10E and the first upper wall 10B. The second member 11 is provided with a second rear wall 11F extending outward from a part of the rear edge of the second side wall 11A located under the first lower wall 10C.

As shown in FIGS. 2 to 4, a tab 10F projects inward from the inner edge of the first lower wall 10C, and a corresponding part of the second side wall 11A is formed with a through hole 11G for passing through the tab 10F. Thus, the tab 10F extends inward beyond the inner surface of the second side wall 11A. A free end part of the tab 10F is formed with an engagement hole 10G consisting of a through hole. The tab 10F received in the through hole 11G reinforces the first member 10 and the second member 11 against external force by reducing the relative movement between the first member 10 and the second member 11.

The second side wall 11A is provided with a pair of reinforcement features 15 located ahead and behind the through hole 11G. In the illustrated embodiment, each reinforcement feature 15 consists of a vertically extending bead formed by locally bulging the first side wall 10A in the inward direction, and extends from a point located above the first lower wall 10C and a point located below the first lower wall 10C. Preferably, each reinforcement feature 15 extends substantially over the entire vertical extent of the second side wall 11A.

As shown in FIGS. 2 and 3, the end part 6B of the front frame 6 is placed inside the channel cross section of the first member 10, and abuts the first side wall 10A, the first upper wall 10B and the first lower wall 10C. The rear end of the end part 6B is fitted into the front opening 13, and abuts the first side wall 10A, the first upper wall 10B, the first lower wall 10C and the contoured part 11C. The contoured parts 11C is conformal to the outer surface of the end part 6B of the front frame 6 so as to closely surround the outer surface of the end part 6B. The end part 6B of the front frame 6 is welded to the first member 10 and the contoured part 11C at appropriate parts.

Each lateral end of the rear frame 7 is fitted into the corresponding rear opening 14, and abuts the inner surface of the first side wall 10A at the end surface thereof. The outer circumferential surface of the rear frame 7 abuts the first upper wall 10B, the first rear wall 10E, the first lower wall 10C, and the edge of the cutout 11E of the second side wall 11A. The rear frame 7 is welded to the first upper wall 10B, the first rear wall 10E, the first lower wall 10C, and the second side wall 11A at appropriate parts.

As shown in FIG. 2, each cushion side frame 5 is rotatably connected to the corresponding support base 2 around a rotational center line extending laterally. The pivot joint between a front end part of the first side wall 10A and the upper end of the support base 2 is covered by a protective member 16 which is made by bending a metallic rod, and is welded to the front frame 6. The protective member 16 keeps the pad of the seat cushion S1 and/or the fingers of the occupant away from the pivot joint between the first side wall 10A and the support base 2.

As shown in FIGS. 3 and 4, a latch mechanism 20 is attached to the outer surface of a part of the second side wall 11A extending further downward than the first lower wall 10C. The latch mechanism 20 includes a casing 23 combining a base plate 21 and a cover plate 22 which are made of stamp formed sheet metal, a hook 24 pivotally supported in the casing 23 and a spring member 25 biasing the hook 24 in a prescribed direction. The base plate 21 and the cover plate 22 are provided with major planes opposing each other and facing the lateral direction. The cover plate 22 is connected to the base plate 21 at the front and rear ends thereof, and a middle part (with respect to the fore and aft direction) thereof bulges outward away from the base plate 21 so that an inner space 26 is defined between the cover plate 22 and the base plate 21. The lower edge of the cover plate 22 is bent toward the base plate 21 so that the lower end of the inner space 26 is substantially closed.

The lower ends of the base plate 21 and the cover plate 22 are formed with vertically extending cutouts which are conformal to each other in side view so as to jointly define a slot 28 of the latch mechanism 20. The hook 24 is positioned in the inner space 26, and is pivotally supported by the base plate 21 and the cover plate 22 via a pivot shaft 24A provided in a vertically middle point of the hook 24 and extending in the lateral direction. The hook 24 can be pivot between a lock position where the hook 24 extends across the slot 28 and a release position where the hook 24 is retracted away from the slot 28. The spring member 25 in this case consists of a tension coil spring having an end engaged by an engagement pin 24B attached to an upper end part of the hook 24 (on the side of the pivot shaft 24A remote from the main part of the hook 24) and another end engaged by the cover plate 22 so as to urge the hook 24 toward the lock position.

The latch mechanism 20 is positioned such that the base plate 21 abuts the outer surface of a part of the second side wall 11A located under the first lower wall 10C, and is attached to the second side wall 11A by fastening members 29 that integrally join the cover plate 22, the base plate 21 and the second side wall 11A to one another. The fastening members 29 may consist of threaded bolts and nut or rivets. The latch mechanism 20 is attached to the second side wall 11A at three locations, one in the front and two in the rear. In particular, a front part of the latch mechanism 20 is attached to a part of the second side wall 11A located ahead of the front reinforcement feature 15, and the rear part of the latch mechanism 20 is attached to a part of the second side wall 11A located behind the rear reinforcement feature 15. In the attached condition, the latch mechanism 20 is essentially located under the first lower wall 10C, or, in other words, is located under the pipe member 12 jointly formed by the first member 10 and the second member 11, and defining a closed cross section. The slot 28 of the latch mechanism 20 is located between the two reinforcement features 15 with respect to the fore and aft direction, and the upper end (bottom) of the slot 28 is located under the lower edge of the second side wall 11A.

As shown in FIG. 3, in a normal use position of the seat S, the beam 3B of the striker 3 abuts the upper end of the slot 28, and is retained in this position by the hook 24 in the lock position. The lower end surface of the hook 24 is slanted in such a manner that when the beam 3B is forced into the slot 28, the hook 24 is displaced to the release position against the biasing force of the spring member 25. Once the beam 3B reaches the upper end of the slot 28, the hook 24 returns to the lock position under the biasing force of the spring member 25 with the result that the beam 3B is firmly retained in the slot 28. If desired, the spring member 25 may be omitted, and the hook 24 may be normally biased toward the lock position by using the gravitational force or any other biasing means.

As shown in FIGS. 3 and 4, the engagement pin 24B of the hook 24 is connected to an end of a control cable 32, and the other end of the control cable 32 is connected to a lever 31 pivotally supported by the rear frame 7. A strap (not shown in the drawings) is connected to the lever 31 so that the lever may be operated by a user via this strap. When this strap is pulled by the user, the hook 24 is displaced to the release position via the lever 31 and the control cable 32 against the biasing force of the spring member 25. Under this condition, the beam 3B of the striker 3 may be removed from the slot 28.

Figure 5:
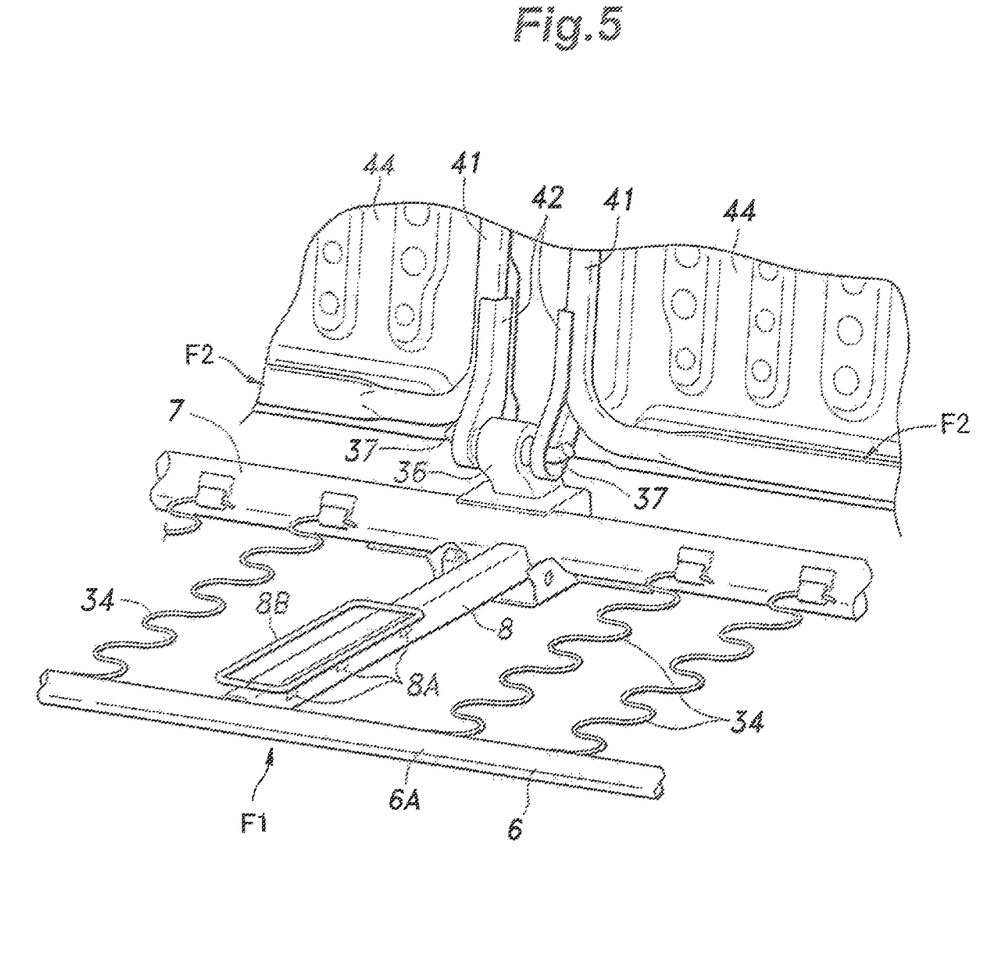
FIG. 5 is an enlarged perspective view of a part of a seat frame surrounding a connecting frame as seen from a direction indicated by arrow V in FIG. 1.

As shown in FIG. 5, the connecting frame 8 consists of a rectangular pipe member extending in the fore and aft direction, and having a rectangular cross section, and has a front end connected to a laterally middle point of the front frame 6 and a rear end connected to a laterally middle point of the rear frame 7. The connecting frame 8 is formed with a plurality of holes 8A passed through the side walls of the connecting frame 8 and arranged along the fore and aft directions. These holes 8A are used for engaging retaining members (now shown in the drawings) for retaining cable members such as a wire harness and a control cable. The retainer may consists of a clip made of plastic material, and may be provided with resilient claws for snap fitting the clip into one or more of the holes 8A.

A rectangular support member 8B formed by bending a metallic rod is attached to the upper surface of the connecting frame 8 so as to extend horizontally in both the lateral directions beyond the side profile of the connecting frame 8. A plurality of wavy wire springs 34 extend between the front frame 6 and the rear frame 7. The support member 8B and the wavy wire springs 34 jointly support the pad of the seat cushion S1 from below.

As shown in FIG. 1, a laterally middle part of the rear frame 7 is fitted with a support block 36 projecting upward from the rear frame 7. The upper end of the support block 36 supports a support shaft 37 projecting from either lateral end of the support block 36. A support plate 39 is fixedly attached to an outer surface of a rear end part of the first side wall 10A of the first member 10 such that the support plate 39 projects upward from the first side wall 10A. The right seat back frame F2 is rotatably supported by the right support plate 39 via the reclining mechanism R and by the support block 36 via the right end of the support shaft 37. The left seat back frame F2 is similarly supported by the left support plate 39 and the left end of the support shaft 37.

The seat back frame F2 consists of a substantially rectangular frame including a pipe frame 41 having a laterally extending main part and a pair of end parts each bent from a corresponding end of the main part and extending downward. The seat back frame F2 further includes a pair of back side frames 42 each connected to the lower end of the corresponding end part of the main part of the pipe frame 51, a rectangular extension frame 43 connected to the main part of the pipe frame 41, and a pan frame 44 connected to the rear sides of the pipe frame 41 and the back side frames 42. The pipe frame 41, the side frames 42, the extension frame 43 and the pan frame 44 all extend in a common major plane. The right back side frame 42 is pivotally supported by the support plate 39 via the reclining mechanism R, and the left back side frame 42 is pivotally supported by the right end of the support shaft 37. The left seat back frame F2 is omitted from the description, as the left seat back frame F2 is a mirror image of the right seat back frame F2, and is otherwise identical to the right seat back frame F2.

As discussed above, the latch mechanism 20 is positioned under the rectangular pipe member 12 defining a closed cross section, and the support plate 39 and the support shaft 27 of the seat back frame F2 are located above the rectangular pipe member 12. In other words, the latch mechanism 20 is located under the support shaft 27 of the seat back frame F2.

How the seat S can be converted from the use position to the tumble (retracted) position is described in the following. First of all, by operating the reclining mechanism R of the seat in the use position, the seat back S2 is folded onto the seat cushion S1. Then, the latch mechanism 20 is released by pulling the strap, and the seat S is brought to the tumble position by lifting the rear end of the seat cushion S1 in an upward and a forward direction, thereby causing a rotation of the seat cushion S1 around the front end of the seat cushion S1.

The features and advantages of the illustrated embodiment are discussed in the following. The closed cross section jointly formed by the first member 10 and the second member 11 contributes to an increase in the stiffness of the cushion side frame 5. Thus, as the latch mechanism 20 is mounted on the second member 11 which forms a part of this closed cross section, the stiffness of the structure for supporting the latch mechanism 20 can be maximized. As the latch mechanism 20 is positioned under the first member 10 or under the closed cross section, the lateral dimension of the assembly including the latch mechanism 20 and the cushion side frame 5 can be minimized. As the latch mechanism 20 is secured to the part of the second member 11 projecting further downward than the first member 10 by using fastening member extending in the lateral direction, the mounting structure for the latch mechanism 20 can be simplified. As the latch mechanism 20 can be attached to the second member 11 from a lateral direction, the assembly work is simplified, as compared to the case where the latch mechanism 20 is attached in an upward direction.

As the base plate 21 and the second side wall 11A are laid over one another in the part where the latch mechanism 20 is attached to the second member 11, the stiffness of the latch mechanism 20 and the second member 11 can be increased.

As the end part 6B of the front frame 6 is positioned in a groove defined by the first upper wall 10B, the first side wall 10A and the first lower wall 10C of the first member 10, and is connected to the first member 10 so as to be in contact with the first upper wall 10B, the first side wall 10A and the first lower wall 10C, the stiffness of the seat cushion frame F1 can be maximized. The rear end of the end part 6B of the front frame 6 is fitted into the front opening 13 defined by the first upper wall 10B, the first side wall 10A and the first lower wall 10C of the first member 10, and is connected to the first member 10 and the second member 11 with the end part 6B in contact with the first upper wall 10B, the first side wall 10A, the first lower wall 10C and the contoured part 11C, the stiffness of the seat cushion frame F1 can be maximized.

The stiffness of the second member 11 is enhanced by the three dimensionally shaped, contoured part 11C and the reinforcement features 15. As the reinforcement features 15 extend from a part of the second member 11 forming a part of the closed cross section to a part of the second member 11 at which the latch mechanism 20 is fastened to the second member 11, the load applied from the latch mechanism 20 to the second member 11 can be favorably transmitted to the part forming the closed cross section.

As the lateral end of the rear frame 7 is fitted into the rear opening 14 defined by the first member 10 and the second member 11, and is joined to the closed cross section structure formed by the first member 10 and the second member 11, the stiffness of the joint between the cushion side frame 5 and the rear frame 7 can be increased, and the stiffness of the cushion side frame 5 can be increased.

As the support plate 39 for pivotally supporting the seat back frame F2 is attached to a part of the first member 10 forming the closed cross section, the stiffness of the support plate 39 can be enhanced, and the seat back frame F2 can be supported in a stable manner.

As the front frame 6 and the rear frame 7 are connected to each other via the connecting frame 8, the central opening of the rectangular seat cushion frame F1 is divided into two parts so that the stiffness of the seat cushion frame F1 can be increased. The connecting frame 8 may also function as a support for the pad of the seat cushion, and may be used for engaging a member for retaining a control cable or any other cable-like members.

Although the present invention has been described in terms of a preferred embodiment thereof, it is obvious to a person skilled in the art that various alterations and modifications are possible without departing from the scope of the present invention. For instance, the second member 11 was positioned on the inner side of the first member 10 in the illustrated embodiment, but the second member 11 may also be positioned on the outer side of the first member 10 without departing from the spirit of the present invention.

The invention claimed is:

1. A method for making a vehicle seat, comprising the steps of:
    forming a seat cushion frame including a pair of side frames extending in a fore and aft direction on either side of the seat cushion frame, a front frame connecting front ends of the side frames to each other, and a rear frame connecting rear ends of the side frames to each other,
    pivotally supporting a front part of the seat cushion frame around a rotational center line extending in the lateral direction with a support base projecting upward from a floor, and
    welding a metallic rod to the seat cushion frame,
    wherein the metallic rod projects laterally from the side frame and covers a pivot joint between the seat cushion frame and the support base, and
    a front part of the metallic rod is located in front of the rotational center line, and a rear part of the metallic rod is located behind the rotational center line.

2. The method for making the vehicle seat according to claim 1, wherein at least one of the side frames includes a first member comprising a channel member having an open side facing sideways and a second member attached to the first member so as to form a closed cross section jointly with the first member and extending downward further than the first member,
    the front frame includes a main part extending laterally and a pair of end parts each bent from a corresponding lateral end of the main part in a rearward direction and received in and fixedly secured to the corresponding first member.

3. The method for making the vehicle seat according to claim 2, wherein the first member and the second member of each side frame jointly define a front opening of the side frame, and the rear part of the corresponding end part of the front frame is passed into a space defined jointly by the first member and the second member from the front opening, the rear part being attached to both the first member and the second member.

4. The method for making the vehicle seat according to claim 3, wherein each rear part of the front frame comprises a pipe member, and the second member is provided with a contoured part conforming to an opposing curved outer surface of the rear part.

5. The method for making the vehicle seat according to claim 1, wherein the first member comprises a vertically extending first side wall, a first upper wall extending from an upper edge of the first side wall and a first lower wall extending from a lower edge of the first side wall in a same direction, and
    the second member comprises a second upper wall overlying the first upper wall, and a second side wall extending downward from the second upper wall beyond the first lower wall,
    wherein the first lower wall is provided with a tab extending beyond a free end edge of the first upper wall, and the second side wall is provided with a through hole for passing through the tab.

6. The method for making the vehicle seat according to claim 5, wherein a part of the tab projecting from the through hole is provided with an engagement feature for engaging another member.

7. The method for making the vehicle seat according to claim 5, wherein the second side wall is provided with a reinforcement feature extending from a part located above the first lower wall to a part located under the first lower wall.

8. The method for making the vehicle seat according to claim 7, wherein a rear end of the first side wall is connected to a rear wall extending in a same direction as the first side wall, and a rear end of the second side wall is positioned ahead of the rear wall so that a rear opening is defined in the side frame, a corresponding end of the rear frame being fitted into the rear opening, and connected to both the first member and the second member.

9. The method for making the vehicle seat according to claim 8, wherein the rear wall connects the first upper wall and the first lower wall to each other, and extends substantially flush with a rear surface of the rear frame.

10. The method for making the vehicle seat according to claim 1, wherein a connecting frame is connected between laterally middle parts of the front frame and the rear frame, the connecting frame being formed with an engagement hole for engaging a retaining piece for retaining a cable.

11. The method for making the vehicle seat according to claim 1, wherein an upper part of the metallic rod is located above the rotational center line, and a lower part of the metallic rod is located below the rotational center line.

12. The method for making the vehicle seat according to claim 1, wherein the metallic rod is bent and located around the pivot joint.

13. The method for making the vehicle seat according to claim 1, wherein the seat cushion frame is fitted with a latch mechanism adapted to be detachably engaged by a striker attached to the floor, and the front part and the rear part of the metallic rod are each located closer to the pivot joint than the latch mechanism.

\* \* \* \* \*